Aug. 9, 1966 C. F. COUSER 3,265,137
GROUND CONDITIONING IMPLEMENT
Filed Feb. 13, 1964 2 Sheets-Sheet 1
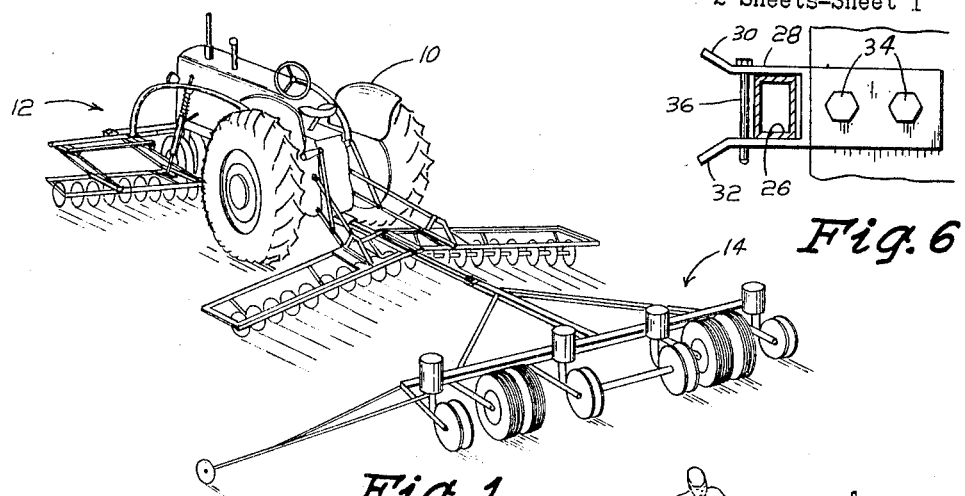
Fig. 6
Fig. 1
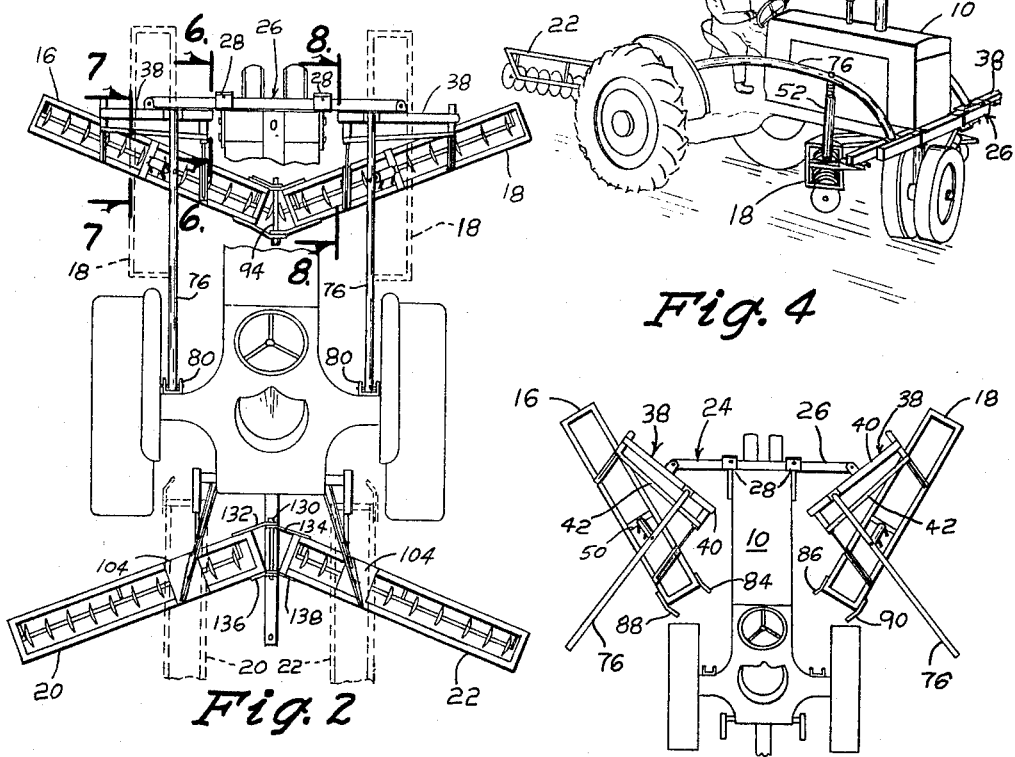
Fig. 2
Fig. 4
Fig. 5
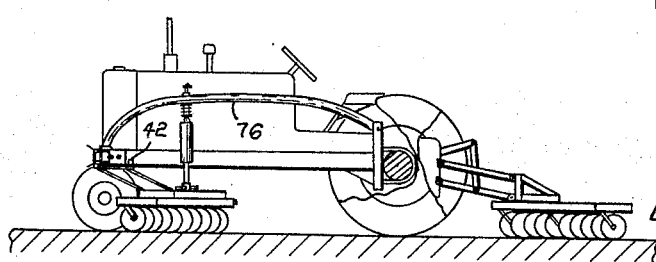
Fig. 3
INVENTOR
CHESTER F. COUSER
BY Dick & Zarley
ATTORNEYS Aug. 9, 1966   C. F. COUSER   3,265,137
GROUND CONDITIONING IMPLEMENT
Filed Feb. 13, 1964   2 Sheets-Sheet 2
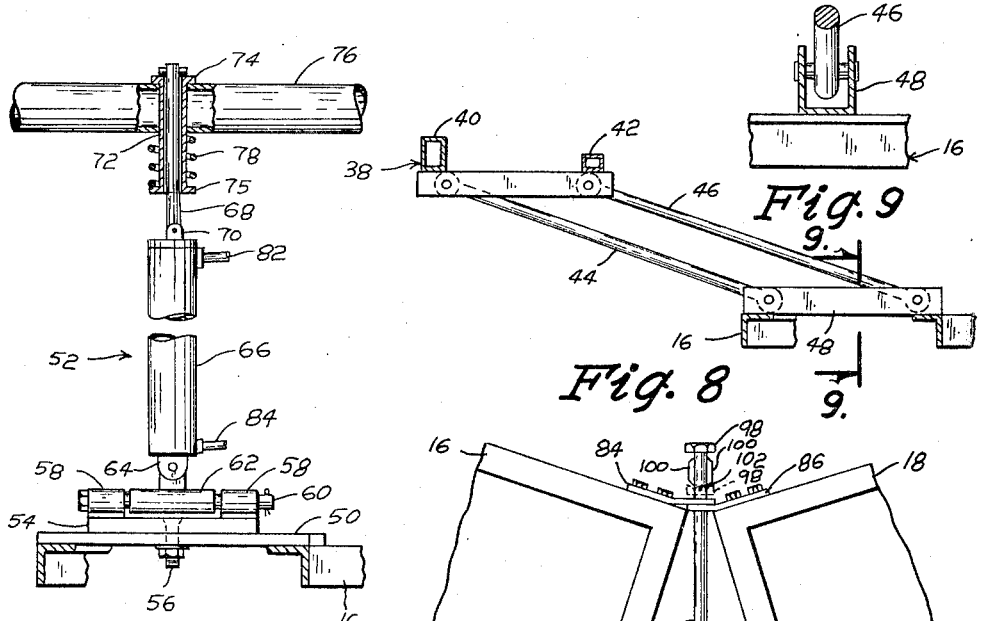
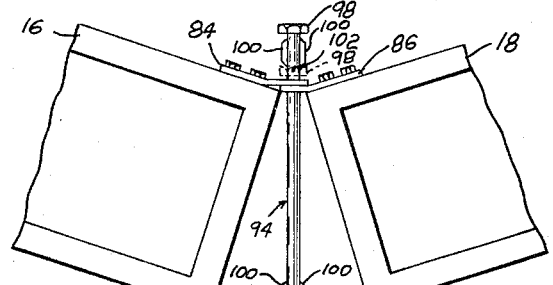
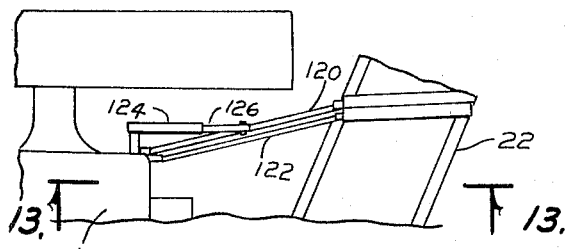
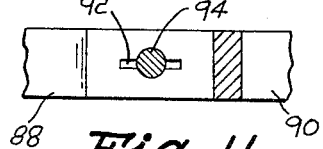
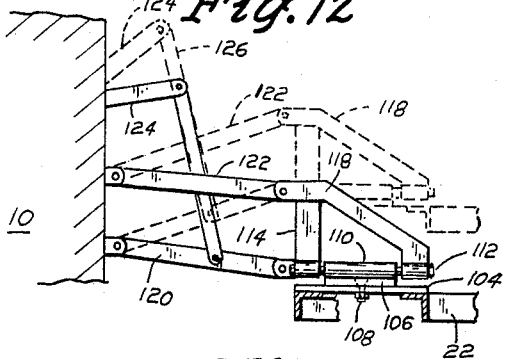
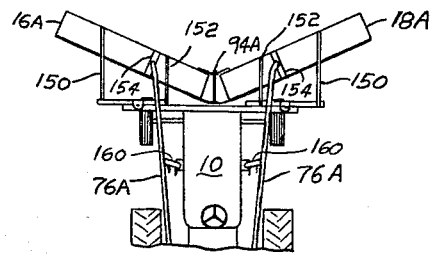
INVENTOR
CHESTER F. COUSER
BY Dick & Zarley
ATTORNEYS

United States Patent Office 3,265,137
Patented August 9, 1966

3,265,137
GROUND CONDITIONING IMPLEMENT
Chester F. Couser, Zearing, Iowa
Filed Feb. 13, 1964, Ser. No. 344,586
3 Claims. (Cl. 172—307)

This invention relates to farm implements and in particular to a ground conditioning implement which may be carried on a tractor or the like.

Therefore, it is one of the objects of this invention to provide a farm implement which may be readily mounted on a tractor and carried thereby.

It is a further object of this invention to provide a farm implement which may be readily moved from a working position to a transporting position on the tractor.

Another object of this invention is to provide a simple but effective mechanism for raising and lowering the implement on the tractor.

A still further object of this invention is to provide a farm implement which may be mounted on the tractor in various positions including on the forward end of the tractor, under the forward end of the tractor and to the rear of the tractor.

A still further object of this invention is to provide a farm implement having tandem sections all of which are carried by the tractor and may be readily secured to and removed from the tractor as well as being readily raised and lowered.

A still further object of this invention is to provide a farm implement having two sections which are connected by means which when moved to one position makes the pair of sections rigid and when moved to another position makes them movable relative to the means.

A further object of this invention is to provide a farm implement having spring means for cushioning the vertical movement of the implement sections as they ride over the ground.

A still further object of this invention is to provide a farm implement ground conditioning machine which is carried on the tractor and thereby permits pulling behind the tractor a seed planter or the like.

A further object of this invention is to provide a ground conditioning implement which is simple in design, economical to manufacture and refined in appearance.

This invention consists in the construction, arrangements, and combination of the various parts of the device, whereby the objects contemplated are attained as hereinafter more fully set forth, specifically pointed out in the claims, and illustrated in the accompanying drawings, in which:

FIG. 1 is a perspective view of a farm tractor with the farm implement of this invention mounted thereon and in a ground working position. Also a corn planter is shown being drawn behind the tractor to illustrate that the ground can be conditioned and planted all in one operation.

FIG. 2 is a top plan view of the tractor and farm implement only showing the forward sections and rearward sections of the implement in both their positions extending laterally of the line of movement and parallel to the line of movement, the latter position being for transporting the implement.

FIG. 3 is a reduced in size side elevation view of the tractor and implement of FIG. 2.

FIG. 4 is a perspective view from the side and forward end of the tractor showing the implement sections raised above the ground for turning corners or transporting.

FIG. 5 is a top plan view of the tractor and front implement sections showing the sections being pivoted from their position extending laterally of the line of movement to the position for removal from the tractor.

FIG. 6 is a cross-sectional side elevation view taken along line 6—6 in FIG. 2 showing in particular the frame member of the implement which is mounted on the front end of the tractor.

FIG. 7 is a cross-sectional elevational view taken along line 7—7 in FIG. 2 showing in particular the lift means connected between an implement section and a hanger rail.

FIG. 8 is a cross-sectional elevation view taken along line 8—8 in FIG. 2 showing in particular the parallel bar support structure connecting the implement sections to the frame assembly.

FIG. 9 is a cross-sectional elevational view taken along line 9—9 in FIG. 8.

FIG. 10 is a top plan view of the inner ends of two implement sections and showing in particular the pin means for interconnecting the inner ends.

FIG. 11 is a cross-sectional elevational view taken along line 11—11 in FIG. 10.

FIG. 12 is a top plan fragmentary view of the parallel bar support assembly for securing the rear sections to the tractor.

FIG. 13 is a side elevation view taken along line 13—13 in FIG. 12 of the parallel bar support structure connecting the rear end of the tractor to the rear implement section, and FIG. 14 is a reduced in scale top plan fragmentary view of another embodiment of the invention showing the forward implement sections being mounted forwardly of the tractor.

In FIG. 1 of the drawing a tractor 10 is shown carrying a tandem disk generally referred to by the reference numeral 12 and a pulling therebehind a conventional seed planter 14.

As shown in FIG. 2 the tandem disk ground conditioning implement includes a pair of forward disk sections 16 and 18 and a pair of rearward sections 20 and 22.

A frame assembly 24 shown in FIG. 5 includes a forward channel member 26 which is secured to the front end of the tractor 10 by a pair of clevises 28 mounted on opposite sides of the tractor 10. As shown in FIG. 6, the clevises 28 have forward flange portions 30 and 32 which flare outwardly. Thus, since the clevis members 28 are fixedly secured to the tractor by bolts 34, the tractor may be driven into the tandem disk 12 and upon engagement of either of the flared portions 30 or 32 with the channel frame member 26 the forward movement of the tractor will cause the channel member 26 to move into its position of use. A pin 36 is then inserted through each of the clevis portions to hold the channel 26 in place on the front end of the tractor.

At the outer ends of the channel member 26 are elongated support frame assemblies 38 for each of the disk sections 16 and 18. The frame assemblies 38 include a pair of spaced apart integrally connected members 40 and 42, member 40 being connected intermediate its ends to the adjacent outer end of the channel frame member 26. As shown in FIG. 8, parallel bars 44 and 46 are pivotally connected to the frame assembles 38 at each end thereof. These bars extend down in parallel relationship where they are in turn pivotally and detachably connected to forward and rearward points on a frame channel 48 of the disk section. Thus it is seen then that each of the disk sections are supported by frame structure 38 by two sets of parallel bars 44 and 46 to permit lowering and raising of the disk sections relative to the ground.

Between the connection of the two pairs of parallel bars to the disk sections, a plate 50, as shown in FIG. 7, is provided for supporting and connecting a lift mechanism 52. A plate 54 is pivotally connected by a bolt 56 to the center of the member 50. At each end of the plate 54 are spaced apart bearing elements 58 which receive a pin 60 extending through a bearing element 62 pivotally connected to the piston 64 of a hydraulic cylinder 66. At the upper end of the cylinder 66, a shaft 68 is pivotally connected by a clevis 70 to the cylinder. A sleeve 72 having annular flanges 74 and 75 at each end thereof embraces the shaft 68 and carries thereon a spring 78. Between the top of the spring 78 and the upper flange 74 the sleeve 72 extends through a hanger rail member 76. The hanger rail member 76 extends from a forward connection to the member 40 as shown in FIG. 5 to a detachable rearward connection on the axle of the tractor as shown in FIG. 2 where a clevis 80 receives the rear end of the hanger member 76. Conventional hydraulic hose lines 82 and 84 are provided on the cylinder 66 and are connected to the hydraulic system of the tractor 10.

As shown in FIG. 10, the inner ends of the disk sections 16 and 18 are provided with overlapping brackets 84 and 86 on the forward side of the sections and brackets 88 and 90 on the rearward side. Each of the brackets is provided with a hole in its outer end and a slot 92 is formed diametrically thereacross as shown in FIG. 11. When the openings in the forward brackets 84 and 86 and the rearward brackets 88 and 90 are in alignment, a pin 94 is received therein. The pin 94 has a head portion 96 at one end and a nut portion 98 at the other end. Inwardly of the head and nut portions are diametrically extending wing portions 100 which are adapted to be matingly received in the respective slots 92 thereby preventing relative rotational movement between the adjacent brackets. When the pin 94 is in the solid line position of FIG. 10, the brackets are free to rotate on the pin and thus the disk sections 16 and 18 may pivot vertically about the longitudinal axis of the pin 94. But, when the pin 94 is moved to the dash line position in FIG. 10, the wings 100 move into engagement with the slots 92 in the brackets and prevents any relative pivotal movement between the sections 16 and 18 about the longitudinal axis of the pin 94. The pin 94 is held in this position by inserting a cotter pin 102 through each of the openings in the pin at its opposite ends.

At the rear of the tractor, the disk sections 20 and 22 are carried and operated in much the same manner as the forward sections 16 and 18. As shown in FIGS. 12 and 13, a plate 104 extends across the disk section 22 and is pivotally connected to a plate 106 by a bolt 108. The bolt 108 is in turn connected to a sleeve bearing 110. It is noted that the sleeve bearing 110 is rotatably connected to the plate 104 to permit rotational movement of the disk sections 20 and 22 in a horizontal plane between the solid line and dash line positions shown in FIG. 2. Extending through the sleeve bearing 110 is a shaft 112 which is pivotally connected to upstanding brackets 114 on the forward side and 118 on the rearward end. These brackets are in turn connected by parallel bars 120 and 122 respectively which are connected at their free ends to the rear end of the tractor 10. A lift arm 124 operated by the hydraulic power assembly on the tractor (not shown) is pivotally connected to a member 126 which in turn is pivotally connected intermediate the ends of the parallel bar member 120. Thus it is seen that as the lift arm 124 is raised in FIG. 13, the parallel bars 120 and 122 simultaneously move to the dash line position raising therewith the disk section 22 to its dash line position.

The inner ends of the disk sections 20 and 22 are connected by a pin 130 which extends through brackets 132 and 134 on the forward sides of the disk sections 20 and 22 and brackets 136 and 138 on the rearward side. Thus it is seen that the forward connection between the disk sections 16 and 18 is similar to the rearward connection between the disk sections 20 and 22 (FIG. 2).

It is apparent that in operation the tractor 10 is driven into the assembled disk sections 16 and 18 whereby the channel member 26 is received in the clevises 28 on the forward end of the tractor. At this time the disk sections 16 and 18 are in the position of FIG. 5. After the frame assembly has been fixedly secured to the tractor by the pins 36 and the clevises 28, the disk sections 16 and 18 are pivoted to a transverse position as shown by the solid lines in FIG. 2 about a pivotal vertical axis extending through the hinge connections at the outer end of the frame member 26. When the inner ends of the disk sections 16 and 18 are positioned with the holes in the brackets 84, 86, 88 and 90 in alignment, the pin 94 is inserted therethrough and locked by the cotter pins 102. If the disk is to be raised for transporting with the sections in their transverse solid line position of FIG. 2, the pin 94 will be moved to its dash line position as shown in FIG. 10 locking the disk sections 16 and 18 together to hold their adjacent inner ends safely above the ground. Otherwise the disk sections would be free to pivot vertically relative to each other about the longitudinal axis of the pin 94. Next, the hanger rails 76 are connected to the clevises 80 on the axles of the tractor. Also the hydraulic lines 82 and 84 of the cylinder 66 are connected to the hydraulic system of the tractor to permit raising and lowering of the disk sections 16 and 18. The rear disk sections 20 and 22 are connected in a similar manner by simply connecting the parallel bars 120 and 122 by pins to the rear of the tractor and connecting the lift member 126 to the lift arm 124.

Thus it is seen that as the disk sections are lowered and raised they swing on their parallel bars as, for example, shown in FIG. 8. When it is desired to transport the tandem disk 12 on the highway or the like, the pins 94 and 130 connecting the adjacent sections are removed. Also the pins connecting the lower ends of each set of parallel bars 44 and 46 to the disc sections 16 and 18 are removed permitting the sections to pivot about an axis through the bolt 56. When the sections are moved to their dash line positions, as shown in FIG. 2, the effective width of the machine is substantially reduced.

The lifting mechanism 52 in FIG. 7 is illustrated in its position when the disc section is raised above the ground. However, it is apparent that when the piston on the lower end of the cylinder 66 is extended downwardly that the disc section will move freely on the ground and when passing over a rise in the ground the section will rise moving the top of the cylinder 66 into engagement with the underside of the flange 75 which is spring biased downwardly by the spring 78.

A second embodiment of the disc sections 16 and 18 is shown in FIG. 14 wherein disc sections 16A and 18A are mounted on the forward end of the tractor 10. A pin 94A connects the inner ends of the disc sections similar to the connection shown in FIG. 10 for the disc sections 16 and 18. Also, parallel bar support members 150 and 152 are used to permit raising and lowering of the disc sections in a similar manner as the parallel bars 44 and 46, as shown in FIG. 8 for example. The hanger rails 76A are longer than their counterparts 76 and are required to extend over and beyond the frame member 26 for the free ends to pivotally connect to plates 154 carried on the disc sections 16A and 18A. Hydraulic lift cylinders 160 are mounted on each side of the tractor and extend between the frame of the tractor and the hanger rails 76A.

It is to be understood that any type of farm machinery may be mounted on the tractor in a similar manner as the disk sections are shown in the drawings. Also, it is obvious that by mounting the ground working equipment on the forward end of the tractor that space is made available at the rear end of the tractor to pull additional farm machinery such as the seed planter 14 whereby the working and planting of the ground may be accomplished in one operation.

Some changes may be made in the construction and arrangement of my ground conditioning implement without departing from the real spirit and purpose of my invention, and it is my intention to cover by my claims, any modified forms of structure or use of mechanical equivalents which may be reasonably included within their scope.

I claim:
1. A ground conditioning implement in combination with a tractor having a frame and forward and rearward wheels,
   a pair of elongated implement sections extending laterally from said tractor frame forwardly of said rearward wheels,
   supporting means movably connecting said implement sections to said tractor frame,
   said supporting means including frame portions extending laterally outwardly in opposite directions from said tractor frame,
   bar members extending between and pivotally connected to each of said implement sections and the adjacent supporting frame portions,
   a hydraulic power means on said tractor connected directly to each of said implement sections for raising and lowering said implement sections by pivoting on said bar members,
   said implement sections being rotatably connected to said power means for movement in a horizontal plane from a working position extending transversely of said tractor frame to a transport position extending parallel to said frame, and
   a rail member disposed in parallel relation to and on each side of said tractor frame, said rail members being secured to a portion of said tractor frame adjacent said rear wheels and to said supporting frame portions, said supporting frame portions being disposed adjacent said front wheels, and said power means having an upper end secured to said rail members and their lower ends to said implement sections, said power means being disposed in a substantially vertical plane.

2. A ground conditioning implement in combination with a tractor having a frame and forward and rearward wheels,
   a pair of elongated implement sections extending laterally from said tractor frame forwardly of said rearward wheels,
   supporting means connecting said implement sections to said tractor frame,
   said supporting means including frame portions extending laterally outwardly in opposite directions from said tractor frame,
   a bar member extending between and pivotally connected to each of said implement sections and the adjacent supporting means,
   a hydraulic power means on said tractor connected to each of said implement sections for raising and lowering said implement sections by pivoting on each of said bar members,
   said implement sections being rotatably connected to said power means for movement in a horizontal plane from a working position extending transversely of said tractor frame to a transport position extending parallel to said frame, and
   said supporting means further including a rail member extending longitudinally on each side of said tractor frame, said rail members being secured to a portion of said tractor frame adjacent said rear wheels and to said supporting frame portions, said supporting frame portions being disposed adjacent said front wheels, and said power means having an upper end secured to said rail members and their lower ends to said implement sections.

3. The structure of claim 2 wherein said implement sections are further defined as being disc sections.

References Cited by the Examiner
UNITED STATES PATENTS

| | | | |
|---|---|---|---|
| 1,559,309 | 10/1925 | Brooks | 172—300 XR |
| 1,911,306 | 5/1933 | Cady | 172—302 |
| 1,945,882 | 2/1934 | Collins | 172—297 XR |
| 2,097,840 | 11/1937 | Olmsted | 172—276 |
| 2,341,181 | 2/1944 | Johnson | 172—307 XR |
| 2,609,741 | 9/1952 | Evenson | 172—276 |
| 2,632,987 | 3/1953 | Jones | 172—568 |
| 2,727,453 | 12/1955 | Altgelt et al. | 172—454 XR |
| 2,747,488 | 5/1956 | Norton | 172—307 |
| 3,001,590 | 9/1961 | Tsuchiya | 172—446 XR |
| 3,078,929 | 2/1963 | Kruse | 172—302 |
| 3,106,970 | 10/1963 | Smith et al. | 172—307 X |

FOREIGN PATENTS 948,563  9/1956  Germany.

ANTONIO F. GUIDA, *Acting Primary Examiner.*
ABRAHAM G. STONE, *Examiner.*
F. B. HENRY, R. L. HOLLISTER, *Assistant Examiners.*